US008352129B2

(12) United States Patent
Yuan et al.

(10) Patent No.: US 8,352,129 B2
(45) Date of Patent: Jan. 8, 2013

(54) MOTION CONTROL OF WORK VEHICLE

(75) Inventors: QingHui Yuan, Osseo, MN (US); Jae Y. Lew, Shorewood, MN (US); Damrongrit Piyabongkarn, Medina, MN (US)

(73) Assignee: Eaton Corporation, Cleveland, OH (US)

( * ) Notice: Subject to any disclaimer, the term of this patent is extended or adjusted under 35 U.S.C. 154(b) by 499 days.

(21) Appl. No.: 12/581,005

(22) Filed: Oct. 16, 2009

(65) Prior Publication Data

US 2010/0095835 A1 Apr. 22, 2010

Related U.S. Application Data

(60) Provisional application No. 61/105,952, filed on Oct. 16, 2008, provisional application No. 61/198,276, filed on Nov. 4, 2008.

(51) Int. Cl.
*G06F 7/70* (2006.01)

(52) U.S. Cl. .......................................................... 701/50

(58) Field of Classification Search ........................ None
See application file for complete search history.

(56) References Cited

U.S. PATENT DOCUMENTS

| | | | | |
|---|---|---|---|---|
| 3,136,385 | A | 6/1964 | Eitel et al. | |
| 3,707,689 | A * | 12/1972 | Morgenthaler | 333/147 |
| 4,456,093 | A | 6/1984 | Finley et al. | |
| 4,916,635 | A | 4/1990 | Singer et al. | |
| 5,638,267 | A | 6/1997 | Singhose et al. | |
| 5,908,122 | A | 6/1999 | Robinett et al. | |
| 6,102,221 | A | 8/2000 | Habisohn | |
| 6,374,147 | B1 * | 4/2002 | Rockwood | 700/69 |
| 6,860,088 | B2 | 3/2005 | Goodman | |
| 6,920,378 | B2 | 7/2005 | Eloundou et al. | |
| 2006/0144130 | A1 * | 7/2006 | Eser et al. | 73/118.1 |
| 2007/0140792 | A1 * | 6/2007 | Quenzi et al. | 404/84.1 |
| 2008/0163750 | A1 * | 7/2008 | Yuan et al. | 91/402 |
| 2008/0267708 | A1 * | 10/2008 | Quenzi et al. | 404/118 |

(Continued)

FOREIGN PATENT DOCUMENTS

EP 2 067 911 A1 6/2009

(Continued)

OTHER PUBLICATIONS

Chang, P. et al., "Time-varying input shaping technique applied to vibration reduction of an industrial robot," *Control Engineering Practice*, vol. 13, pp. 121-130 (2005).

(Continued)

*Primary Examiner* — Thomas Tarcza
*Assistant Examiner* — Adam Alharbi
(74) *Attorney, Agent, or Firm* — Merchant & Gould P.C.

(57) ABSTRACT

A method for controlling a boom assembly includes providing a boom assembly having an end effortor. The boom assembly includes an actuator in fluid communication with a flow control valve. A desired coordinate of the end effector of the boom assembly is converted from Cartesian space to actuator space. A deflection error of the end effector based on a measured displacement of the actuator is calculated. A resultant desired coordinate of the end effector is calculated based on the desired coordinate and the deflection error. A control signal for the flow control valve is generated based on the resultant desired coordinate and the measured displacement of the actuator. The control signal is shaped to reduce vibration of the boom assembly. The shaped control signal is transmitted to the flow control valve.

20 Claims, 8 Drawing Sheets

U.S. PATENT DOCUMENTS

2009/0204259 A1* 8/2009 Danko .......................... 700/250

FOREIGN PATENT DOCUMENTS

WO WO 2008/043218 A1 4/2008

OTHER PUBLICATIONS

Danielson, J., "Mobile Boom Cranes and Advanced Input Shaping Control," Master Thesis, *Georgia Institute of Technology*, pp. i-xii and 1-138 (Aug. 2008).

International Search Report and Written Opinion mailed Mar. 1, 2010.

Park, Y. et al., "Vibration control of a telescopic handler using time delay control and commandless input shaping technique," *Control Engineering Practice*, vol. 12, pp. 769-780 (2004).

Yuan, Q. et al., "Motion Control of an Aerial Work Platform," *American Control Conference*, Hyatt Regency Riverfront, St. Louis, Missouri, pp. 2873-2878 (Jun. 10-12, 2009).

* cited by examiner

MOTION CONTROL OF WORK VEHICLE

CROSS-REFERENCE TO RELATED APPLICATIONS

The present application claims priority to U.S. Provisional Patent Application Ser. No. 61/105,952 entitled "Motion Control of an Aerial Work Platform" and filed on Oct. 16, 2008 and U.S. Provisional Patent Application Ser. No. 61/198,276 entitled "Structural Vibration Cancellation using Electronically Controlled Hydraulic Servo-Valves" and filed on Nov. 4, 2008. The above identified disclosures are hereby incorporated by reference in their entirety.

BACKGROUND

Construction vehicles can be used to provide temporary access to relatively inaccessible areas. Many of these vehicles include a boom having multiple joints. The boom can be controlled by controlling the displacements of the joints. However, such control is dependent on an operator's proficiency.

As the boom is extended, vibration becomes a concern. Conventional techniques to reduce or eliminate vibration typically result in systems that are not responsive to their operators.

SUMMARY

An aspect of the present disclosure relates to a method for controlling a boom assembly. The method includes providing a boom assembly having an end effortor. The boom assembly includes an actuator in fluid communication with a flow control valve. A desired coordinate of the end effector of the boom assembly is converted from Cartesian space to actuator space. A deflection error of the end effector based on a measured displacement of the actuator is calculated. A resultant desired coordinate of the end effector is calculated based on the desired coordinate and the deflection error. A control signal for the flow control valve is generated based on the resultant desired coordinate and the measured displacement of the actuator. The control signal is shaped to reduce vibration of the boom assembly. The shaped control signal is transmitted to the flow control valve.

Another aspect of the present disclosure relates to a work vehicle. The work vehicle includes a boom assembly having an end effector. An actuator engaged to the boom assembly. The actuator is adapted to position the boom assembly. An actuator sensor is adapted to measure the displacement of the actuator. A flow control valve is in fluid communication with the actuator. A controller is in electrical communication with the flow control valve. The controller is adapted to actuate the flow control valve in response to an input signal. The controller includes a motion control scheme that includes a coordinate transformation module, a deflection compensation module, an axis control module, and an input shaping module. The coordinate transformation module converts a desired coordinate of the end effector of the boom assembly from Cartesian space to actuator space. The deflection compensation module calculates a deflection error of the end effector based on measurements from the actuator sensor. The axis control module generates a control signal based on the desired coordinate, the deflection error and the measurements from the actuator sensor. The input shaping module shapes the control signal transmitted to the flow control valve to reduce vibration of the boom assembly.

Another aspect of the present disclosure relates to a method of calibrating the damping ratio and the natural frequency of a boom assembly using a flow control valve. The method includes receiving pressure signals from pressure sensors regarding pressure in an actuator. High and low pressure values and times associated with those pressure values are recorded for a first cycle. High and low pressure values and times associated with those pressure values are recorded for a second cycle. Natural frequency and damping ratio are calculated based on the pressure values and times associated with those pressure values for the first and second cycles.

Another aspect of the present disclosure relates to a method for shaping a control signal for a flexible structure. The method includes generating a control signal based on a desired coordinate. The control signal is shaped using a time-varying input shaping scheme. The time-varying input shaping scheme receives a measurement from a sensor, estimates a natural frequency and damping ratio of the flexible structure based on the measurement of the sensor and shapes the control signal based on the measurement and the estimated natural frequency and the damping ratio.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
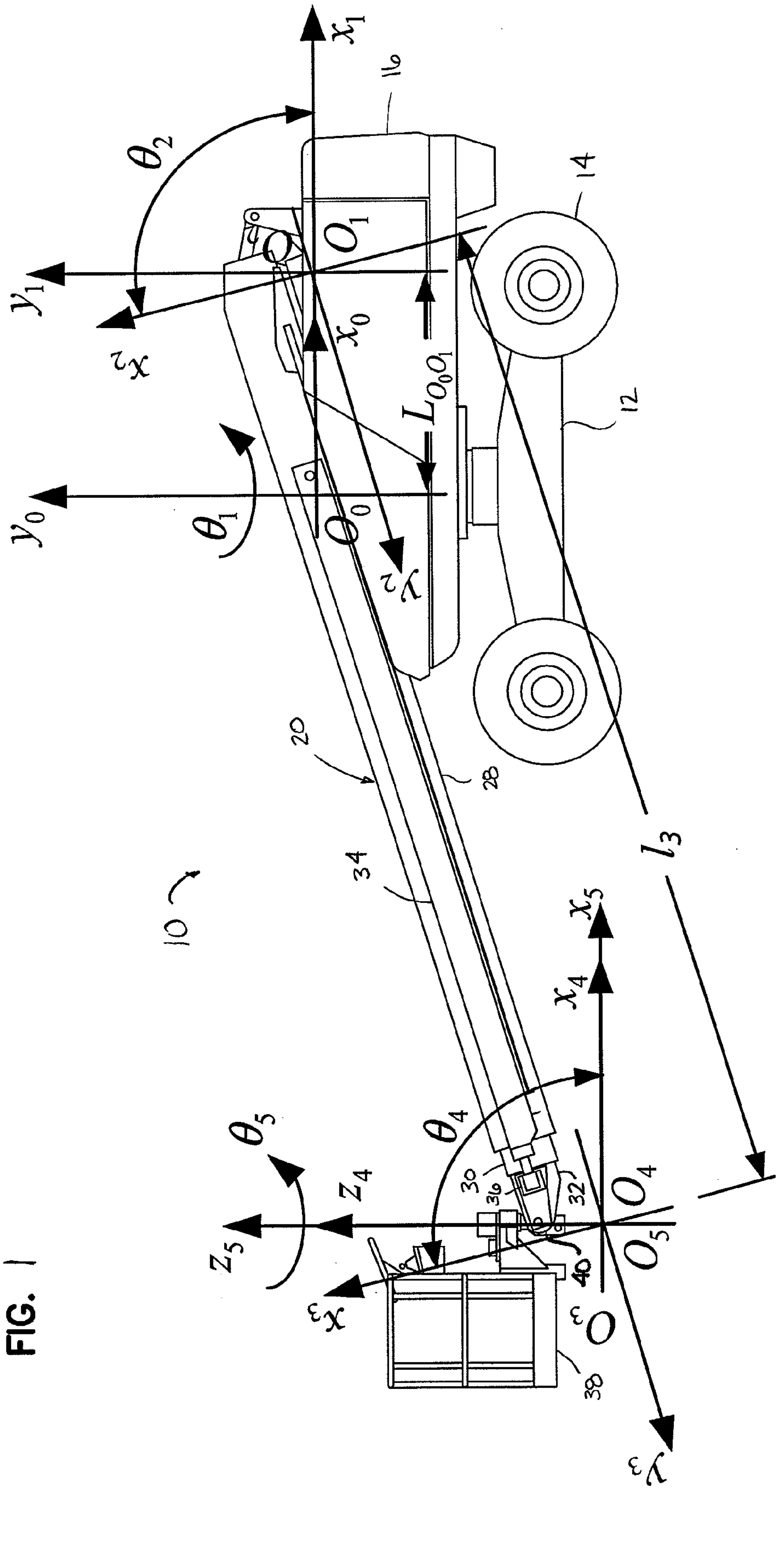
FIG. 1 is a side view of a work vehicle having exemplary features of aspects in accordance with the principles of the present disclosure.

Referring now to FIG. 1, an exemplary work vehicle, generally designated 10, is shown. The work vehicle 10 includes multiple joints that are actuated using linear and/or rotary actuators (e.g., cylinders, motors, etc.). These linear and rotary actuators are adapted to extend or retract a boom assembly and to control a work platform disposed on an end of the boom assembly.

The work vehicle 10 includes a plurality of flow control valves and a plurality of sensors. The flow control valves are controlled by an electronic control unit of the work vehicle 10. The electronic control unit receives desired inputs from an operator and measured inputs from the plurality of sensors. Using a motion control scheme, the electronic control unit outputs signals to the flow control valves to move the work platform to a desired location. The motion control scheme is adapted to reduce vibration in the boom assembly and to maintain good responsiveness to operator input.

While the work vehicle 10 could be one of a variety of work vehicles, such as a crane, a boom lift, a scissor lift, etc., the work vehicle 10 will be described herein as being an aerial work platform for ease of description. The aerial work platform 10 is adapted to provide access to areas that are generally inaccessible to people at ground level due to height and/or location.

In the depicted embodiment of FIG. 1, the aerial work platform 10 includes a base 12 having a plurality of wheels 14. The aerial work platform 10 further includes a body 16 that is rotatably mounted to the base 12 so that the body 16 can rotate relative to the base 12. The rotation angle of the body 16 is denoted by $\theta_1$. A first motor 18 (shown in FIG. 2) rotates the body 16 relative to the base 12. In one aspect of the present disclosure, the first motor 18 is coupled to a gear reducer.

A flexible structure 20 is mounted to the body 16 with a revolute joint. For ease of description, the flexible structure 20 will be described herein as a boom assembly 20. The boom assembly 20 can move upwards and/or downwards. This upwards and/or downwards movement of the boom assembly 20 is denoted by a rotation angle $\theta_2$ of the boom assembly 20. A first cylinder 22 (shown in FIG. 2) is adapted to raise and lower the boom assembly 20. A first end 24 (shown in FIG. 2) of the first cylinder 22 is connected to the boom assembly 20 while a second end 26 (shown in FIG. 2) is connected to the body 16.

The boom assembly 20 includes a base boom 28, an intermediate boom 30 and a tip boom 32. The base boom 28 is connected to the body 16 of the aerial work platform 10. The intermediate and tip booms 30, 32 are telescopic booms that extend outwardly from the base boom 28 in an axial direction. As shown in FIG. 1, the intermediate and tip booms 30, 32 are in a retracted position. The length $l_3$ of the boom assembly 20 can be changed by retracting or extending the intermediate and tip booms 30, 32. The length $l_3$ of the boom assembly 20 is changed via a second cylinder 34 and corresponding mechanical linkage 36.

A work platform 38 is mounted to an end 40 of the tip boom 32. The pitch of the work platform 38 is held parallel to the ground by a master-slave hydraulic system design while a yaw orientation $\theta_5$ of the work platform 38 is controlled by a second motor 42.

Figure 2:
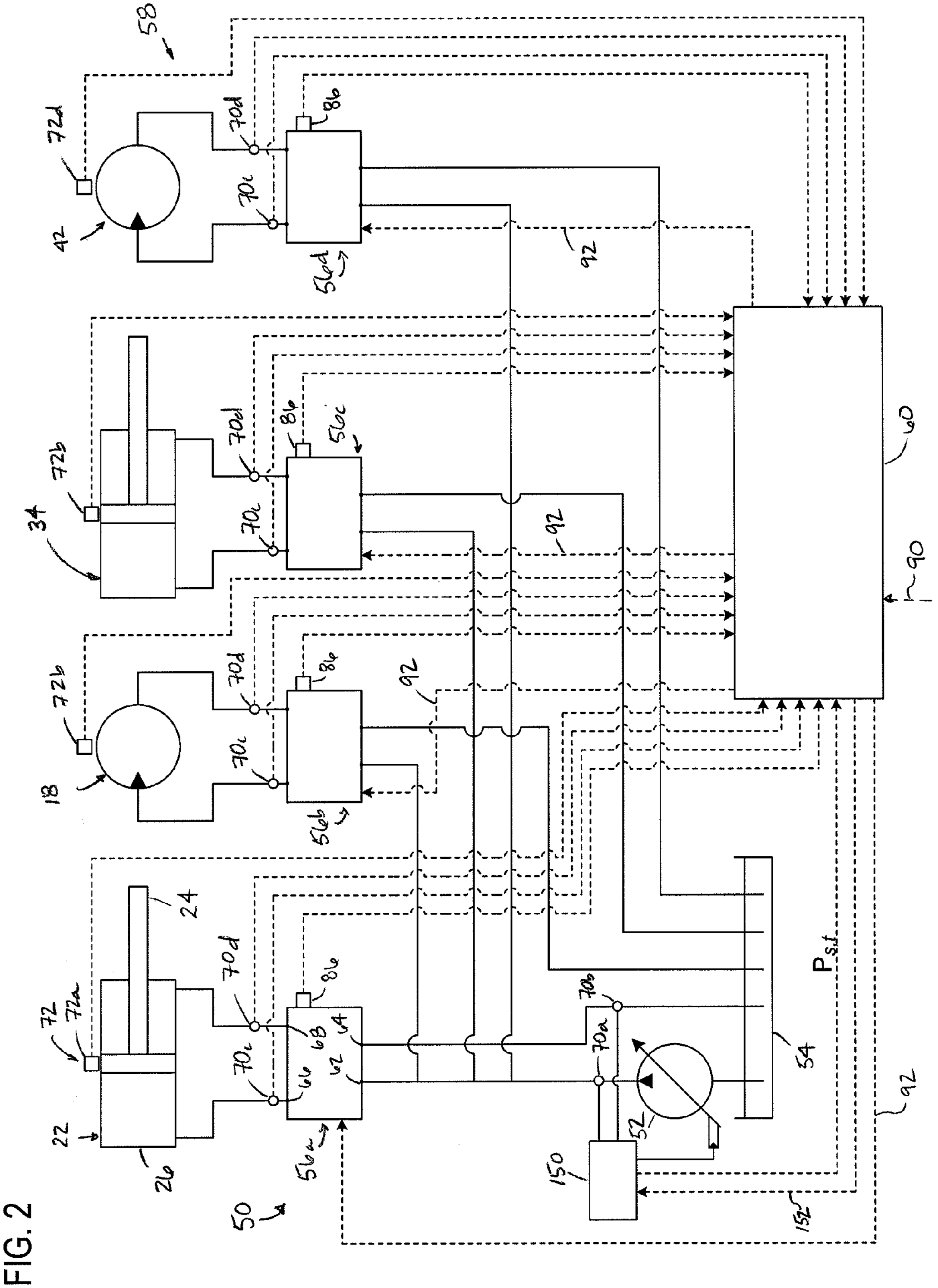
FIG. 2 is a schematic representation of a control system for the work vehicle of FIG. 1.

Referring now to FIG. 2, a simplified schematic representation of a control system 50 for the aerial work platform 10 is shown. The control system 50 includes a fluid pump 52, a fluid reservoir 54, a plurality of flow control valves 56, a plurality of actuators 58 and a controller 60.

In one aspect of the present disclosure, the fluid pump 52 is a load-sensing pump. The load-sensing pump 52 is in fluid communication with a load sensing valve 150. The load-sensing valve 150 is adapted to receive a signal 152 from the controller 60. In one aspect of the present disclosure, the signal 152 is a pulse width modulation signal.

The plurality of actuators 58 includes the first and second cylinders 22, 34 and the first and second motors 18, 42. The plurality of flow control valves 56 is adapted to control the plurality of actuators 58. By controlling the plurality of actuators 58, the work platform 38 can reach a desired location with a desired orientation within the work envelope of the aerial work platform 10.

In one aspect of the present disclosure, a first flow control valve 56*a* is in fluid communication with the first cylinder 22, a second flow control valve 56*b* is in fluid communication with the second cylinder 34, a third flow control valve 56*c* is in fluid communication with the first motor 18 and a fourth flow control valve 56*d* is in fluid communication with the second motor 42. A valve suitable for use as each of the flow control valves 56*a*-56*d* has been described in UK Pat. No. GB2328524 and U.S. Pat. No. 7,518,523, the disclosures of which are hereby incorporated by reference in their entirety. Each of the flow control valves 56*a*-56*d* includes a supply port 62 that is in fluid communication with the fluid pump 52, a tank port 64 that is in fluid communication with the fluid reservoir 54, a first control port 66 and a second control port 68 that are in fluid communication with one of the plurality of actuators 58.

The control system 50 further includes a plurality of fluid pressure sensors 70. In one aspect of the present disclosure, a first pressure sensor 70*a* monitors the fluid pressure from the fluid pump 52 while a second pressure sensor 70*b* monitors the fluid pressure going to the fluid reservoir 54. The first and second pressure sensors 70*a*, 70*b* are in communication with the controller 60. In one aspect of the present disclosure, the first and second pressure sensors 70*a*, 70*b* are in communication with the controller 60 through the load sensing valve 150.

Each of the fluid control valves 56*a*-56*d* is in fluid communication with a third pressure sensor 70*c* and a fourth pressure sensor 70*d*. The third and fourth pressure sensors 70*c*, 70*d* monitor the fluid pressure to and from the corresponding actuator 58 at the first and second control ports 66, 68, respectively. In one aspect of the present disclosure, the third and fourth pressure sensors 70*c*, 70*d* are integrated into the flow control valves 56*a*-56*d*.

The control system 50 further includes a plurality of actuator sensors 72 that monitor the axial or rotational position of the plurality of actuators 58. The plurality of actuator sensors 72 is adapted to send signals to the controller 60 regarding the displacement (e.g., position) of the plurality of actuators 58.

In the depicted embodiment of FIG. 2, first and second actuator sensors 72*a*, 72*b* monitor the displacement of the first and second cylinders 22, 34. In one aspect of the present disclosure, the first and second actuator sensors 72*a*, 72*b* are laser sensors. Third and fourth actuator sensors 72*c*, 72*d* monitor the rotation of the first and second motors 18, 42. In one aspect of the present disclosure, the third and fourth actuator sensors 72*c*, 72*d* are absolute angle encoders.

Figure 3:
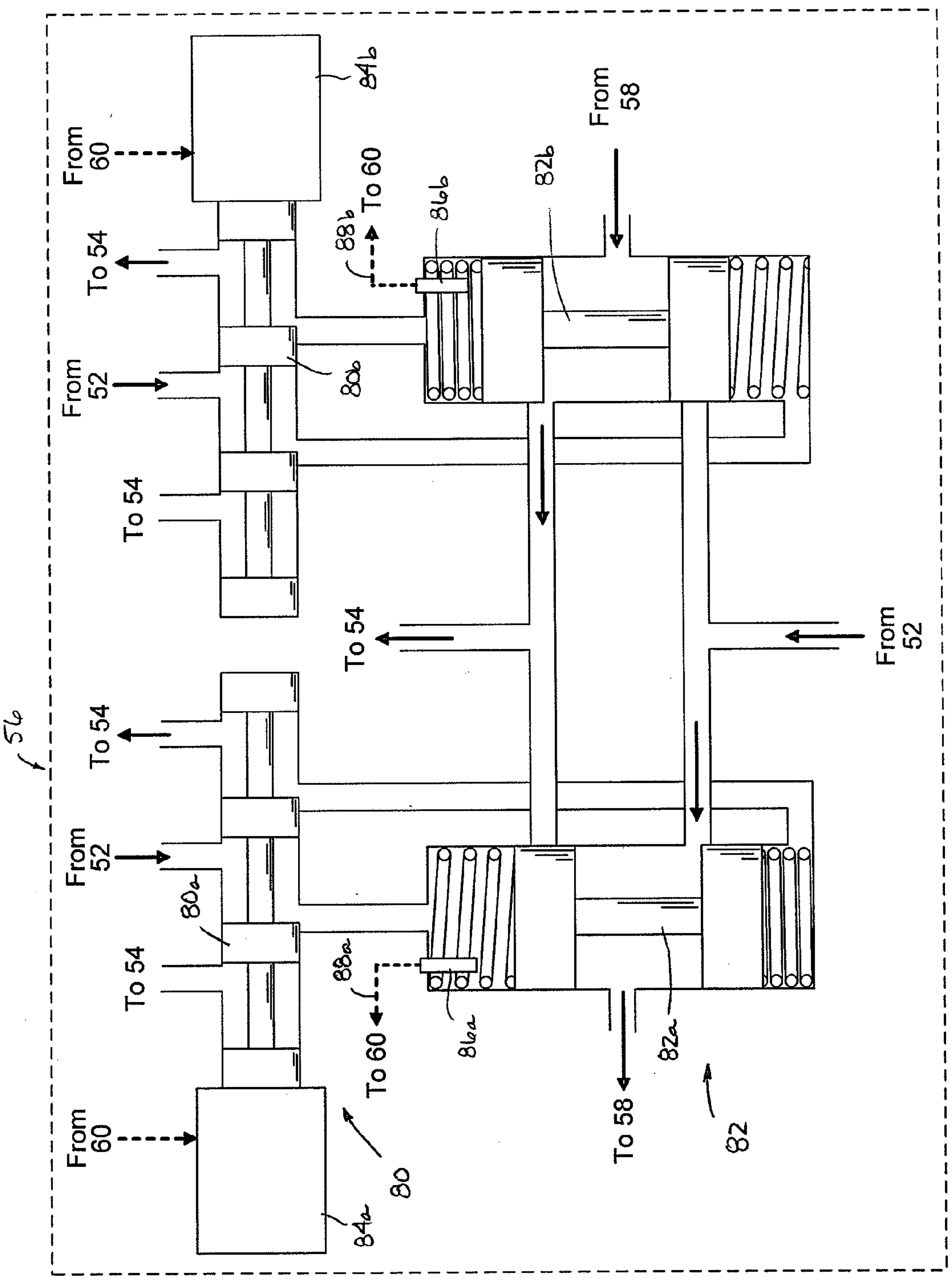
FIG. 3 is a schematic representation of a flow control valve suitable for use in the control system of FIG. 2.

Referring now to FIGS. 2 and 3, the flow control valves 56*a*-56*d* will be described. As each of the first, second, third and fourth flow control valves 56*a*-56*d* is structurally similar, the first, second, third and fourth flow control valves 56*a*-56*d* will be referred to as the flow control valve 56. The flow control valve 56 includes at least one pilot stage spool 80 and at least one main stage spool 82. In the depicted embodiment of FIG. 3, the flow control valve 56 includes a first pilot stage spool 80*a* and a second pilot stage spool 80*b* and a first main stage spool 82*a* and a second main stage spool 82*b*.

The positions of the first and second pilot stage spools 80*a*, 80*b* control the positions of the first and second main stage spools 82*a*, 82*b*, respectively, by regulating the fluid pressure that acts on either end of the first and second main stage spools 82*a*, 82*b*. The positions of the first and second main stage spools 82*a*, 82*b* control the fluid flow rate to the corresponding actuator 58.

The positions of the first and second pilot stage spools 80*a*, 80*b* are controlled by first and second actuators 84*a*, 84*b*. In one aspect of the present disclosure, the first and second actuators 84*a*, 84*b* are electromagnetic actuators, such as voice coils.

First and second spool position sensors 86*a*, 86*b* measure the positions of the first and second main stage spools 82*a*, 82*b* and send a first and second signal 88*a*, 88*b* that corresponds to the positions of the first and second main stage spools 82*a*, 82*b* to the controller 60. In one aspect of the present disclosure, the first and second spool position sensors 86*a*, 86*b* are linear variable differential transformers (LVDT).

Figure 4:
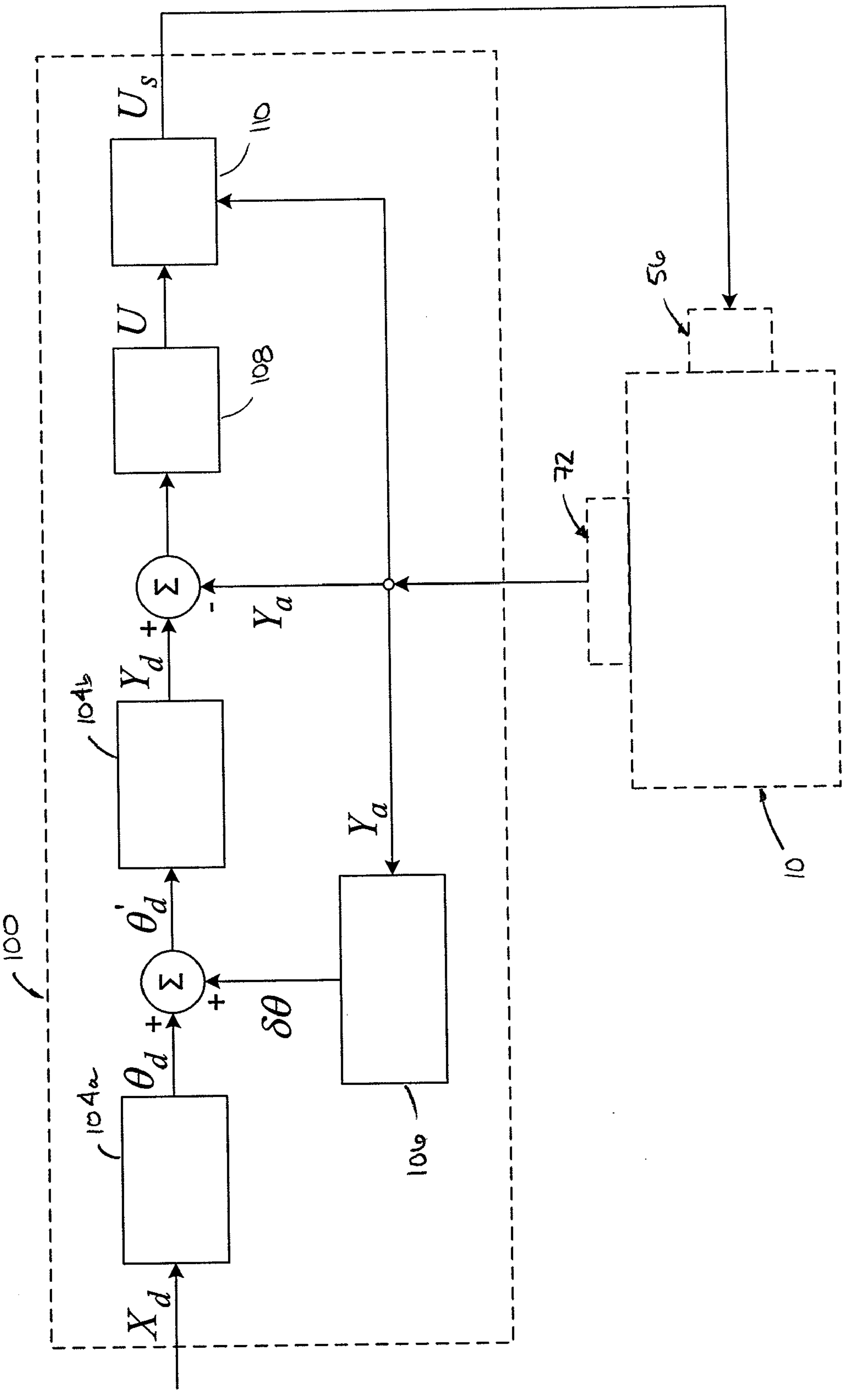
FIG. 4 is a schematic representation of a motion control scheme used by a controller of the control system of FIG. 2.

Referring now to FIGS. 1, 2 and 4, the controller 60 is adapted to receive signals from the plurality of actuator sensors 72 regarding the plurality of actuators 58 and the plurality of spool position sensors 86 regarding the position of the main stage spools 82 of the flow control valves 56. In addition, the controller 60 is adapted to receive an input 90 regarding a desired output from the operator. The controller 60 sends signals 92 to the first and second actuators 84*a*, 84*b* of the flow control valves 56*a*-56*d* for actuation of the plurality of actuators 58. In one aspect of the present disclosure, the signal 92 are pulse width modulation signals.

In the depicted embodiment of FIG. 2, the controller 60 is shown as a single controller. In one aspect of the present disclosure, however, the controller 60 includes a plurality of controllers. In another aspect of the present disclosure, the plurality of controllers 60 is integrated in the plurality of flow control valves 56.

The controller 60 includes a motion control scheme 100. The motion control scheme 100 is a closed loop coordinated control scheme. The motion control scheme 100 includes a trajectory generator, a coordinate transformation module 104, a deflection compensation module 106, an axis control module 108 and an input shaping module 110.

The trajectory generator generates the desired Cartesian coordinate $X_d=[x_0,y_0,z_0,\phi_0]^T$ for an end effector (e.g., work platform 38) of the work vehicle 10 based on the input 90 from the operator. The Cartesian coordinate includes the position and orientation of the end effector.

In one aspect of the present disclosure, the coordinate transformation module 104 includes a first coordinate transformation module 104*a* and a second coordinate transformation module 104*b*. The first coordinate transformation module 104*a* converts coordinates from Cartesian space to joint space. The second coordinate transformation module 104*b* converts coordinates from joint space to actuator space. Table I lists the independent variables in Cartesian space, joint space and actuator space for the plurality of actuators 58.

TABLE I

Relationship among Cartesian space, joint space and actuator space

| Cartesian Space | Joint Space | Actuator Space |
|---|---|---|
| $x^0$ | $\theta_1$ | $\theta_1$ |
| $y^0$ | $\theta_2$ | $L_{AB}$ |
| $z^0$ | $l_3$ | $l_3$ |
| $\phi^0$ | $\theta_5$ | $\theta_5$ |

The first coordinate transformation module 104*a* converts the desired Cartesian coordinate $X_d$ to a desired coordinate $\Theta_d=[\theta_1,\theta_2,l_3,\theta_5]^T$ in joint space. The forward transformation equation in Cartesian coordinates is given by the following equation:

$$X^{i-1}=T_i^{i-1}X^i, \qquad (112)$$

Where $X^i$ is the position vector $[x^i,y^i,z^i,1]^T$ in the $O_i-x_iy_iz_i$ reference frame having an origin at $O_i$, $T_i^{i-1}$ is given by the following equation:

$$T_i^{i-1}=\begin{bmatrix} \cos\theta_i & -\sin\theta_i\cos\alpha_i & \sin\theta_i\sin\alpha_i & a_i\cos\theta_i \\ \sin\theta_i & \cos\theta_i\cos\alpha_i & -\cos\theta_i\sin\alpha_i & a_i\sin\theta_i \\ 0 & \sin\alpha_i & \cos\alpha_i & d_i \\ 0 & 0 & 0 & 1 \end{bmatrix}, \qquad (114)$$

which is the homogeneous transformation (position and orientation) of the $O_i-x_iy_iz_i$ reference frame relative to the previous reference frame $O_{i-1}-x_{i-1}y_{i-1}z_{i-1}$ for i=1, 2, . . . , 5. $T_{i,(1\text{-}3)\times(1\text{-}3)}^{i-1}$ are direction cosine of the coordinate axes of $O_i-x_iy_iz_i$ relative to $O_{i-1}-x_{i-1}y_{i-1}z_{i-1}$, and $T_{i,(1\text{-}3)\times(4)}^{i-1}$ is the position of $O_{i-1}$ in $O_{i-1}-x_{i-1}y_{i-1}z_{i-1}$ reference frame.

In equation 114, the Denavit-Hartenberg notation is used to describe the kinematic relationship. $a_i$ is the length of the common normal, $d_i$ is the distance between the origin $O_{i-1}$ and the intersection of the common normal to $z_{i-1}$, $\alpha_i$ is the angle between the joint axis $z_i$ and $z_{i-1}$ with respect to $z_{i-1}$, and $\theta_i$ is the angle between $x_{i-1}$ and the common normal with respect to $z_{i-1}$. The parameters for the work platform 38 are given in Table II.

TABLE II

Parameter of Denavit-Hartenberg Transformation for Coordinates defined in FIG. 1.

| Joint Number | $a_i$ | $\theta_i$ | $d_i$ | $\alpha_i$ |
|---|---|---|---|---|
| 1 | $L_{O_0O_1}$ | $\theta_1$ | 0 | +90° |
| 2 | 0 | $\theta_2$ | 0 | −90° |
| 3 | 0 | 0 | $l_3$ | +90° |
| 4 | 0 | $\theta_4$ | 0 | −90° |
| 5 | 0 | $\theta_5$ | 0 | 0 |

The end effector position and orientation can be obtained by using the values of the joint displacements (i.e., $\theta_1$, $\theta_2$, $l_3$, $\theta_4$, $\theta_5$) in equation 116 below. In this particular case $\theta_4$ is not an independent variable since $\theta_4=\theta_2$ as shown in FIG. 1.

$$T_5^0=T_1^0(\theta_1)T_2^1(\theta_2)T_3^2(l_3)T_4^3(\theta_2)T_5^4(\theta_5). \qquad (116)$$

To solve equation 116, take the origin of $O_5-x_5y_5z_5$, $O_5$ as an end effector. If the position of $O_5$ relative to $O_0-x_0y_0z_0$ is $[x_0,y_0,z_0]^T$ and the angle between $x_5$ and $x_0$ is $\phi_0$, there is a homogeneous transformation matrix of $O_5-x_5y_5z_5$ in $O_0-x_0y_0z_0$:

$$T_5^0=\begin{bmatrix} \cos\phi_0 & \sin\phi_0 & 0 & x_0 \\ \sin\phi_0 & -\cos\phi_0 & 0 & y_0 \\ 0 & 0 & 0 & z_0 \\ 0 & 0 & 0 & 1 \end{bmatrix}. \qquad (118)$$

Multiplying both sides of equation 118 by $T_1^0(\theta_1)^{-1}$ gives the following equation:

$$T_1^0(\theta_1)^{-1}T_5^0=T_2^1(\theta_2)T_3^2(l_3)T_4^3(\theta_2)T_5^4(\theta_5), \qquad (120)$$

which represents $O_5$ in the $O_1-x_1y_1z_1$ reference frame. The left side of equations 118 and 120 yield:

$$\begin{bmatrix} \cos\theta_1 & \sin\theta_1 & 0 & -L_{O_0O_1} \\ 0 & 0 & 1 & 0 \\ \sin\theta_1 & -\cos\theta_1 & 0 & 0 \\ 0 & 0 & 0 & 1 \end{bmatrix} \begin{bmatrix} \cos\phi_0 & \sin\phi_0 & 0 & x_0 \\ \sin\phi_0 & -\cos\phi_0 & 0 & y_0 \\ 0 & 0 & 0 & z_0 \\ 0 & 0 & 0 & 1 \end{bmatrix} = \tag{122}$$

$$\begin{bmatrix} \cos\theta_1\cos\phi_0 + \sin\theta_1\sin\phi_0 & * & * & x_0\cos\theta_1 + y_0\sin\theta_1 - L_{O_0O_1} \\ * & * & * & z_0 \\ * & * & * & x_0\sin\theta_1 - y_0\cos\theta_1 \\ * & * & * & * \end{bmatrix}.$$

The right side of equation 120 yields:

$$\begin{bmatrix} \cos\theta_5 & * & * & -l_3\sin\theta_2 \\ * & * & * & l_3\cos\theta_2 \\ * & * & * & 0 \\ * & * & * & * \end{bmatrix}. \tag{124}$$

From equations 122 and 124, the Cartesian-to-joint transformation can be formulated as:

$$\Theta(X) := \begin{bmatrix} \theta_1 \\ \theta_2 \\ l_3 \\ \theta_5 \end{bmatrix} = \begin{bmatrix} \arctan\left(\frac{y_0}{x_0}\right) \\ \arctan\left(\frac{L_{O_0O_1} - x_0\cos\theta_1 - y_0\sin\theta_1}{z_0}\right) \\ \frac{z_0}{\cos\theta_2} \\ \phi - \theta_1 \end{bmatrix}. \tag{126}$$

Referring now to FIGS. 1, 2, 4 and 5, the deflection compensation module 106 will be described. With the desired Cartesian coordinate $X_d$ converted to the desired coordinate $\Theta_d$ in joint space, the deflection compensation module 106 accounts for deflection of the boom assembly 20. The deflection compensation module 106 receives measurements from the plurality of actuator sensors 72, which monitor the actual axial and/or rotational position of the plurality of actuators 58. Using these measurements, the deflection compensation module 106 calculates a corresponding error correction in joint space.

Figure 5:
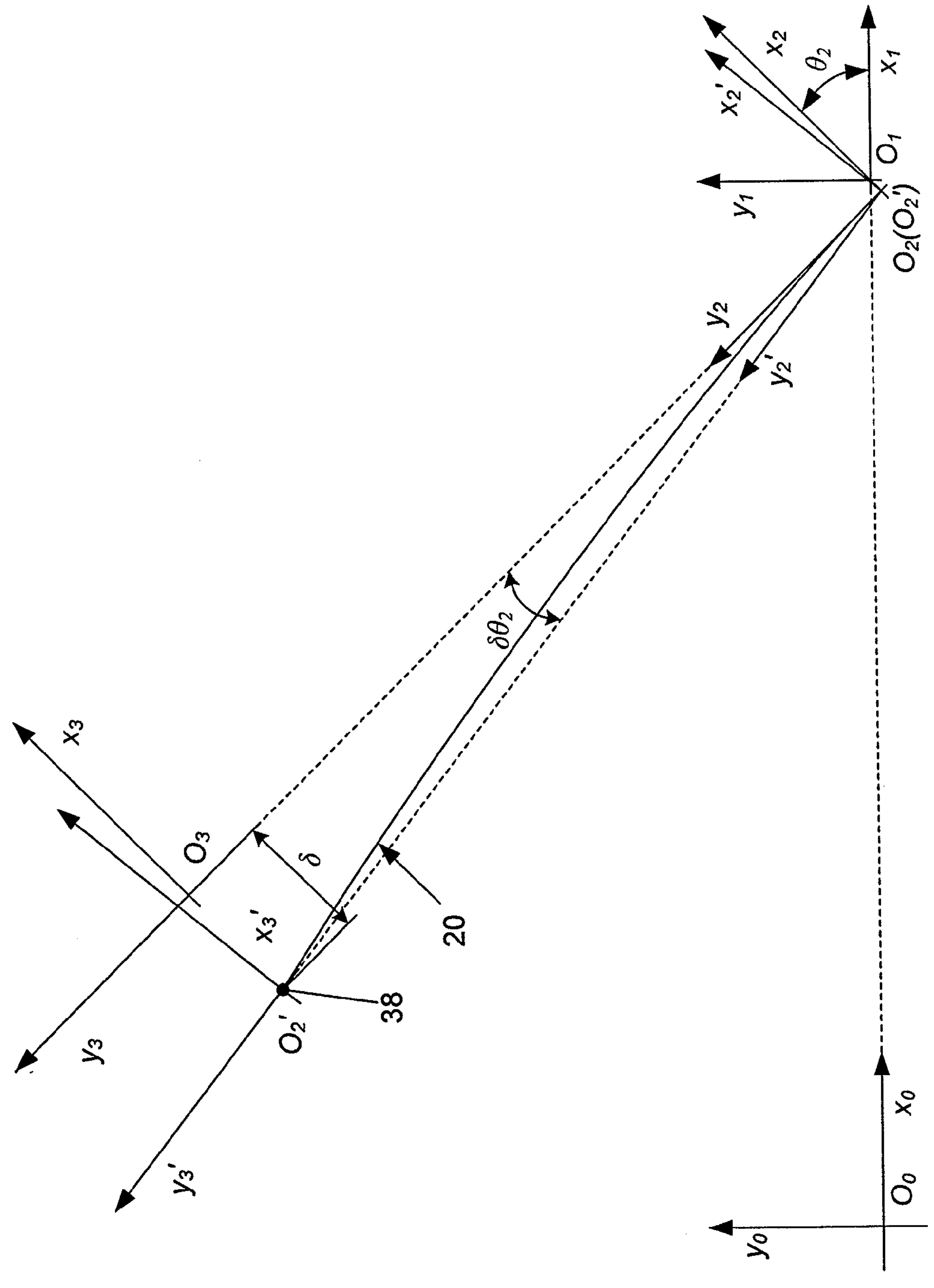
FIG. 5 is a schematic representation of deflection of a boom assembly of the work vehicle of FIG. 1.

For a long flexible structure, such as the boom assembly 20, deflection of that structure can cause a large error between an ideal end effector coordinate and the actual end effector coordinate. This deflection error is a function of the end effector coordinate. For example, for different lifting heights and lengths, the deflection will be different. The deflection error in joint space primarily comes from the rotation angle $\theta_2$ of the boom assembly 20, as shown in FIG. 5. The deflection errors for the other degrees of freedom are negligibly small. Therefore, $\delta\Theta=[0,\delta\theta_2,0,0]^T$.

A quasi-steady analysis of deflection compensation is provided below. This quasi-steady analysis is appropriate in this case since vibration in the boom assembly 20 is reduced or eliminated as a result of the input shaping module 110, which will be described in greater detail below.

The deflection of the boom assembly 20 is affected by gravity acting on the boom assembly 20 and the load acting on the work platform 38. The deflection of the boom assembly 20 is a function of the length $l_3$ of the boom assembly 20 and the rotation angle $\theta_2$ of the boom assembly 20. Assuming a uniformly distributed cross section of the boom assembly 20, the deflection can be calculated using the following equation:

$$\delta(l_3, \theta_2) = \left(\frac{mgl_3^3}{3EI} + \frac{\rho gl_3^4}{8EI}\right)\sin\theta_2, \tag{128}$$

where E is the modulus of elasticity of the beam material, I is the moment of inertia of the cross section of the beam, ρ is the mass length density, and m is the mass of the load. A rigid boom assembly with a rotation angle $\theta'_2$ can have the same tip position if $\delta\theta_2 := \theta'_2 - \theta_2$ is given by the following equation:

$$\delta\theta_2(l_3, \theta_2) = \frac{\delta(l_3, \theta_2)}{l_3} = \left(\frac{mgl_3^2}{3EI} + \frac{\rho gl_3^3}{8EI}\right)\sin\theta_2. \tag{130}$$

Equation 130 is in joint space while the actual measurements of the actuator sensors 72 are in actuator space. Therefore, an actuator-to-joint space transformation would be needed for this conversion.

Referring now to FIGS. 1, 2, 4, and 6, the second coordinate transformation module **104*b* will be described. The second coordinate transformation module 104*b* converts the resultant desired coordinate $\Theta'_d=\Theta_d+\delta\Theta$ in joint space to actuator space. Actuator space refers to the plurality of actuators 58. In one aspect of the present disclosure, actuator space refers to the first and second cylinders 22, 34 and the first and second motors 18, 42**. Table I, which is provided above, lists the independent variables for Cartesian space, joint space and actuator space. There is direct correspondence between the independent variables $\theta_1$, $\theta_2$, and $\theta_5$ in joint space and the corresponding independent variables in actuator space. The relationship between $l_3$ and $L_{AB}$, however, will now be described.

Figure 6:
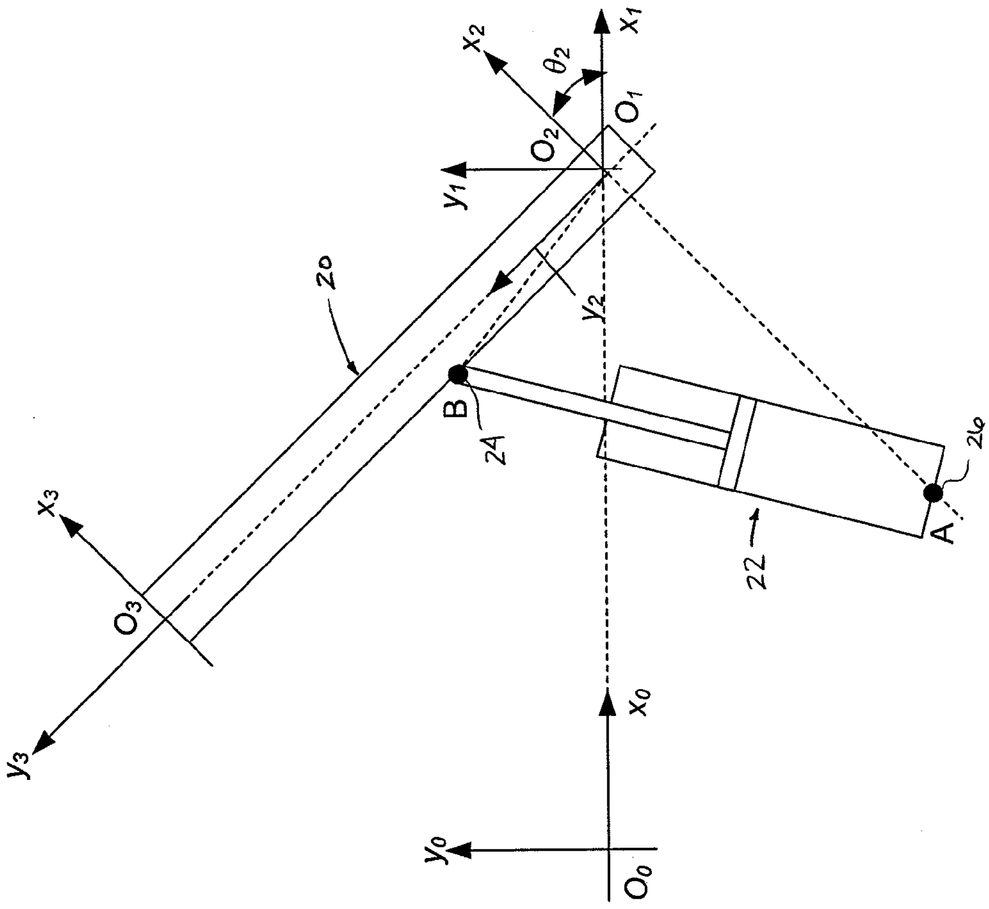
FIG. 6 is a schematic representation of a joint-actuator space transformation.

Referring now to FIG. 6, a schematic representation of the boom assembly 20 and the first cylinder 22. The second end 26 of the first cylinder 22 is mounted to the body 16 of the work vehicle 10 at point A while the first end 24 of the first cylinder 22 is mounted to the boom assembly 20 at point B. Point A is a fixed point in reference frame $O_1-x_1y_1z_1$ associated with the body 16 while point B is a fixed point in the reference frame $O_2-x_2y_2z_2$ associated with the boom assembly 20. The length $l_{AB}$ between the points A and B is a function of the rotation angle $\theta_2$ of the boom assembly 20 and can be calculated using the following equation:

$$l_{AB}(\theta_2) = \sqrt{L_{BO_1}^2 + L_{AO_1}^2 - 2L_{AO_1}L_{BO_1}\cos\angle BO_1A(\theta_2)}, \tag{132}$$

where $\angle BO_1A(\theta_2)=90°+\angle O_0O_1A-\theta_2-\angle BO_1O_3$.

The joint to actuator space transformation is then:

$$Y(\Theta) := \begin{bmatrix} \theta_1 \\ l_{AB}(\theta_2) \\ l_3 \\ \theta_5 \end{bmatrix}. \tag{134}$$

With the resultant desired coordinate $\Theta'_d$ converted to actuator space $Y_d=[\theta_1, L_{AB}, l_3, \theta_5]^T$, the resultant desired coordinate $Y_d$ and the actual measurements $Y_a$ from the plurality of actuator sensors 72 are received by the axis control module 108. The axis control module 108 generates the control signal U for the flow control valves 56.

The control signal U is a vector of flow commands $q_n$. The flow commands $q_n$ correspond to the plurality of actuators 58. In one aspect of the present disclosure, a velocity feedforward proportional integral (PI) controller is used to generate the flow commands $q_n$. The velocity feedforward PI controller could be:

$$q_n=K_{f,n}\dot{y}_{d,n}+K_{p,n}(y_{d,n}-y_{a,n})+K_{i,n}\int(y_d-y_a)dt, \qquad (136)$$

where $q_n$ is the flow command for valve n, $K_{f,n}$, $K_{p,n}$, $K_{i,n}$ are the feedforward, proportional and integral gains, respectively, and $y_{d,n}$ and $y_{a,n}$ are the desired and actual displacements for axis number n=1, 2, 3, 4. For the first and second cylinders 22, 34, the gains $K_{f,n}$, $K_{p,n}$, $K_{i,n}$ will be slightly different for each direction due to piston area ratio.

An exemplary control signal U generated by the axis control module 108 is $U=[q_1,q_2,q_3,q_4]^T$. In one aspect of the present disclosure, the flow control valves 56 include embedded pressure sensors 70, embedded spool position sensors 88 and an inner control loop. These sensors and inner control loop allow the axis control module 108 to send flow commands $q_n$ directly to the flow control valves 56 as opposed to sending spool position commands.

Referring now to FIGS. 1 and 4, the input shaping module 110 will be described. The input shaping module 110 is adapted to reduce the structural vibration in the boom assembly 20 of the work vehicle 10.

An input shaping scheme suppresses vibration by generating shaped command inputs. The effects of modeling errors can be reduced by increasing the number of impulses in an input shaping scheme. However, as the number of impulses in the input shaping scheme increases, the responsiveness of the command input decreases.

In one aspect of the present disclosure, the input shaping scheme is a time-varying input shaping scheme. The time-varying input shaping scheme reduces the amount of vibration while maintaining good responsiveness. In one aspect of the present disclosure, the time-varying input shaping scheme utilizes only two impulses. In addition, the time-varying input shaping scheme uses measurements from the plurality of actuator sensors 72 to provide a control signal having time-varying parameters.

The time-varying input shaping scheme first estimates a damping ratio $\zeta(t)$ and a natural frequency $\omega_n(t)$ of the boom assembly 20 based on the actual measurements $Y_a$ from the plurality of actuator sensors 72. The equations for damping ratio and natural frequency are:

$$\zeta(t)=f_\zeta(Y_a)=f_\zeta(l_3(t)), \text{ and} \qquad (138)$$

$$\omega_n(t)=f_\omega(Y_a)=f_\omega(l_3(t)), \qquad (140)$$

where $f_\zeta$ and $f_\omega$ are functions based on the length $l_3$ of the boom assembly 20. These functions $f_\zeta$ and $f_\omega$ can be determined from modeling or by experimental calibration with the assumption that $l_3$ is the only dominant variable among all the measured variables and the effect from the payload is negligibly small. In one aspect of the present disclosure, the flow control valve 56 determines the damping ration function and the natural frequency function $f_\zeta$ and $f_\omega$, respectively. This determination of the damping ration function and the natural frequency function $f_\zeta$ and $f_\omega$ by the flow control valve 56 will be described in greater detail subsequently.

Next, the amplitudes of the two impulses are given by the following equations:

$$A_1(t)=\frac{1}{1+K(t)} \qquad (142)$$

$$A_2(t)=\frac{K(t)}{1+K(t)}, \qquad (144)$$

where $$K(t)=\exp\left(\frac{\zeta(t)\pi}{\sqrt{1-\zeta(t)^2}}\right).$$

The time delay for each impulse is:

$$\Delta T_1(t)=0 \qquad (146)$$

$$\Delta T_2(t)=\frac{\pi}{\omega_n(t)\sqrt{1-\zeta(t)^2}}. \qquad (148)$$

Finally, the shaped control signal $U_s$ is given by the following equation:

$$U_s=\begin{bmatrix} q_1 \\ A_1(t)U_2(t-\Delta T_1(t)+A_2(t)U_2(t-\Delta T_2(t)) \\ q_3 \\ q_4 \end{bmatrix}. \qquad (150)$$

The shaped control signal $U_s$ is sent to the flow control valves 56 so that fluid can be passed through the flow control valves 56 to the actuators 58 to move the work platform 38. As previously provided, the input shape module 110 is potentially advantageous as it reduces or eliminates vibrations in the boom assembly 20 while maintaining responsiveness of the boom assembly 20.

Figure 7:
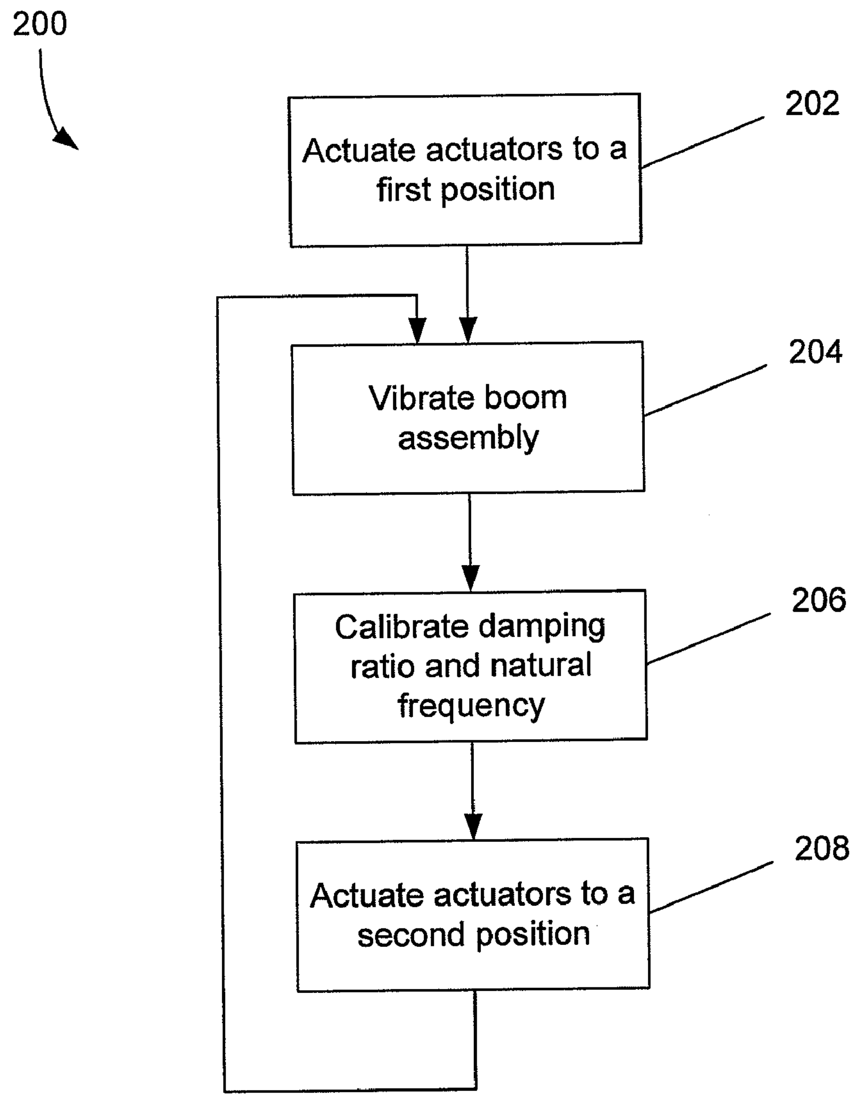
FIG. 7 is a representation of a method for determining a damping ratio and a natural frequency of the boom assembly.

Referring now to FIGS. 1 and 7, an exemplary method 200 for the determining the damping ratio $\zeta(t)$ and the natural frequency $\omega_n(t)$ will be described. In step 202, the actuators are actuated to a first position. For example, the first and second cylinders 22, 34 are moved to positions in which damping ratios and natural frequencies are expected (e.g., full extension of first and second cylinders 22, 34, partial extension of first and second cylinders 22, 34, etc.).

In step 204, the boom assembly 20 is vibrated. In one aspect of the present disclosure, the boom assembly 20 is vibrated by applying a force to the boom assembly 20. In another aspect of the present disclosure, the boom assembly 20 is vibrated by quickly moving an input device (e.g., joystick, etc.) on the work vehicle that controls the movement of the boom assembly 20. This movement imparts a short pulse of hydraulic fluid to the first and/or second cylinders 22, 34 which causes the boom assembly 20 to vibrate.

In step 206, the damping ratio $\zeta(t)$ and the natural frequency $\omega_n(t)$ are calibrated. In one aspect of the present disclosure, the calibration of the damping ratio and the natural frequency is done by the flow control valve 56.

Figure 8:
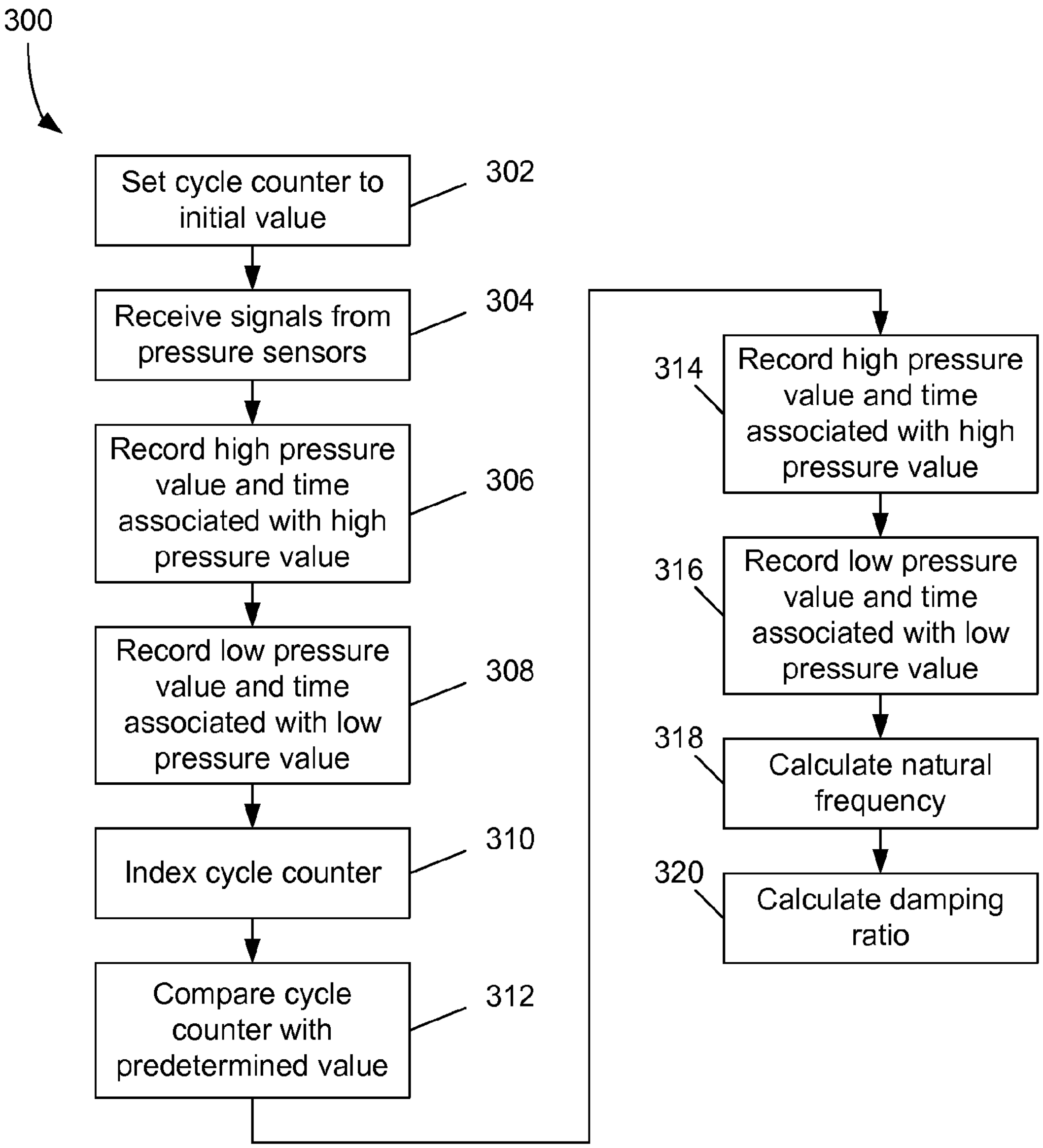
FIG. 8 is a representation of a method for calibrating the damping ratio and the natural frequency using the flow control valve.

Referring now to FIGS. 1, 7 and 8, a method 300 of calibrating the damping ratio and the natural frequency using the flow control valve 56 will be described. In step 302, a cycle counter N is set to an initial value, such as 1. As the flow control valve 56 includes integrated pressure sensors 70, the flow control valve 56 receives signals from the pressure sensors 70 in step 304. The flow control valve 56 records the pressure $P_{HI,1}$ when the pressure signal is at its highest value (peak) and the time $t_{HI,1}$ at which the peak pressure $P_{HI,1}$ occurs in step 306. The flow control valve 56 also records the pressure $P_{LO,1}$ when the pressure signal is at its lowest value (trough) and the time $t_{LO,1}$ at which the pressure $P_{LO,1}$ occurs in step 308.

In step 310, the cycle counter N is indexed (N=N+1) when the pressure is at its next peak value. In step 312, the cycle counter N is compared to a predefined value. If the cycle counter N equals the predefined value, the flow control valve 56 records the pressure $P_{HI,2}$ when the pressure signal is at its highest value (peak) for that given cycle and the time $t_{HI,2}$ at which the peak pressure $P_{HI,2}$ occurs for that given cycle in step 314. The flow control valve 56 also records the pressure $P_{LO,2}$ when the pressure signal is at its lowest value (trough) for that given cycle and the time $t_{LO,2}$ at which the pressure $P_{LO,2}$ occurs for that given cycle in step 316.

In step 318, the natural frequency $\omega_n$ (t) is calculated. The natural frequency $\omega_n$ (t) can be calculated for small damping systems where the vibration is typically large using the following equation:

$$\omega_n \approx \frac{2\pi N}{t_{HI,2} - t_{HI,1}}. \quad (152)$$

In step 320, the damping ratio ζ(t) is calculated. The damping ratio ζ(t) is a measure describing how oscillations in the boom assembly 20 decrease after a disturbance. The amplitude is given by:

$$\frac{\exp(-\zeta\omega_n t_{HI,2})}{\exp(-\zeta\omega_n t_{HI,1})} = \exp(-\zeta\omega_n(t_{HI,2} - t_{HI,1})) = \frac{P_{HI,2} - P_{LO,2}}{P_{HI,1} - P_{LO,1}}. \quad (154)$$

The solution to equation 154 is:

$$\zeta = \frac{-\log\left(\frac{P_{HI,2} - P_{LO,2}}{P_{HI,1} - P_{LO,1}}\right)}{\frac{\omega_n}{t_{HI,2} - t_{HI-1}}}. \quad (156)$$

Referring again to FIGS. 1 and 7, with the damping ratio and natural frequency calculated for a given actuator 58 position, the actuator 58 is moved to a second position in step 208 and the damping ratio ζ(t) and the natural frequency $\omega_n$(t) are determined for that actuator position using steps 204-206.

While the damping ratio and natural frequency are only calibrated at discrete actuator positions, interpolation can be used to determine the damping ratio and natural frequency for actuator positions other than these discrete actuator positions. In one aspect of the present disclosure, linear interpolation can be used.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for controlling a boom assembly, the method comprising:

providing a boom assembly having an end effector, the boom assembly including an actuator that is in fluid communication with a flow control valve;

converting a desired coordinate of the end effector of the boom assembly from Cartesian space to actuator space;

calculating a deflection error of the end effector due to bending of the boom assembly based on a measured displacement of the actuator;

calculating a resultant desired coordinate based on the desired coordinate and the deflection error;

generating a control signal based on the resultant desired coordinate and the measured displacement of the actuator;

shaping the control signal to reduce vibration of the boom assembly; and transmitting the shaped control signal to the flow control valve.

2. The method of claim 1, wherein the control signal is shaped using a time-varying input shaping scheme.

3. The method of claim 2, wherein the time-varying input shaping scheme includes two impulses.

4. The method of claim 1, wherein a first coordinate transformation converts the desired coordinate from Cartesian space to joint space and a second coordinate transformation converts the desired coordinate from joint space to actuator space.

5. The method of claim 4, wherein the deflection error is provided in joint space coordinates.

6. The method of claim 1, wherein the shaped control signal is given by:

$$U_s = \begin{bmatrix} q_1 \\ A_1(t)U_2(t - \Delta T_1(t) + A_2(t)U_2(t - \Delta T_2(t)) \\ q_3 \\ q_4 \end{bmatrix}.$$

7. The method of claim 1, wherein the actuator sensor is a laser sensor.

8. The method of claim 1, wherein the actuator sensor is an absolute angle encoder.

9. A work vehicle comprising:

a boom assembly having an end effector;

an actuator engaged to the boom assembly, wherein the actuator is adapted to position the boom assembly;

an actuator sensor adapted to measure the displacement of the actuator;

a flow control valve being in fluid communication with the actuator;

a controller being in electrical communication with the flow control valve, the controller being adapted to actuate the flow control valve in response to an input signal, wherein the controller includes a motion control scheme that includes:

a coordinate transformation module that converts a desired coordinate of the end effector of the boom assembly from Cartesian space to actuator space;

a deflection compensation module that calculates a deflection error of the end effector due to bending of the boom assembly based on measurements from the actuator sensor;

an axis control module that generates a control signal based on the desired coordinate, the deflection error and the measurements from the actuator sensor; and an input shaping module that shapes the control signal transmitted to the flow control valve to reduce vibration of the boom assembly.

10. The work vehicle of claim 9, wherein the work vehicle is an aerial work platform.

11. The work vehicle of claim 9, wherein the end effector is a work platform.

12. The work vehicle of claim 9, wherein the flow control valve includes a plurality of pressure sensors that are integrated into the flow control valve.

13. The work vehicle of claim 9, wherein the input shaping module is a time-varying input shaping scheme.

14. The work vehicle of claim 13, wherein the time-varying input shaping scheme includes only two impulses.

15. The work vehicle of claim 13, wherein the time-varying input shaping scheme estimates the damping ratio and natural frequency of the boom assembly based on measurements from the actuator sensor.

16. The work vehicle of claim 15, wherein the flow control valve determines a damping ratio function and a natural frequency function used to estimate the damping ratio and natural frequency.

17. A method of calibrating the damping ratio and the natural frequency of a boom assembly using a flow control valve, the method comprising:

receiving pressure signals from pressure sensors regarding pressure in an actuator;

recording high and low pressure values and times associated with those pressure values for a first cycle;

recording high and low pressure values and times associated with those pressure values for a second cycle; and calculating natural frequency and damping ratio based on the pressure values and times associated with those pressure values for the first and second cycles.

18. The method of claim 17, wherein the pressure sensors are integrated in the flow control valve.

19. A method for shaping a control signal for a control valve in fluid communication with an actuator for a flexible structure, the method comprising:

generating a control signal based on a desired coordinate;

shaping the control signal using a time-varying input shaping scheme, wherein the time-varying input shaping scheme:

receives a measurement from a sensor;

estimates a natural frequency and damping ratio of the flexible structure based on the measurement of the sensor; and shapes the control signal based on the measurement and the estimated natural frequency and damping ratio, transmitting the shaped control signal to the control valve.

20. The method of claim 19, wherein the control signal is based on a resultant desired coordinate that accounts for deflection errors associated with the flexible structure.

* * * * *